United States Patent
Fujimoto et al.

(10) Patent No.: US 6,577,957 B2
(45) Date of Patent: Jun. 10, 2003

(54) APPARATUS AND METHOD FOR DETECTING ABNORMALITY IN A POSITION DETECTION DEVICE

(75) Inventors: Chiaki Fujimoto, Tokyo (JP); Yukio Fukushima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/962,345

(22) Filed: Sep. 26, 2001

(65) Prior Publication Data

US 2002/0152039 A1 Oct. 17, 2002

(30) Foreign Application Priority Data

Apr. 13, 2001 (JP) .......................... 2001-115250

(51) Int. Cl.⁷ .............................. G06F 15/00
(52) U.S. Cl. .................. 702/36; 702/72; 702/189; 701/41; 701/43; 318/661; 318/254
(58) Field of Search ............... 702/36, 64, 66, 702/72, 94, 150, 189; 701/43, 41, 47; 318/661, 254; 347/116

(56) References Cited

U.S. PATENT DOCUMENTS

| 4,715,461 A | * | 12/1987 | Shimizu | ............. 180/446 |
| 5,691,611 A | | 11/1997 | Kojima et al. | |
| 6,191,550 B1 | | 2/2001 | Yoshihara | |
| 6,427,104 B1 | * | 7/2002 | Matsushita et al. | ........ 701/41 |

FOREIGN PATENT DOCUMENTS

EP          0 978 947 A2      2/2000
JP          3-78668           4/1991

OTHER PUBLICATIONS

Official Action of the German Patent and Trademark Office with English translation dated Nov. 15, 2002.
Patent Abstracts of Japan 01262415 A, Published Oct. 19, 1989, NEC Corp.
Patent Abstracts of Japan 2000039337 A, Published Feb. 8, 2000, Toyota Motor Corp.
Patent Abstracts of Japan 03238317 A, Published Oct. 24, 1991, Yokogawa Electric Corp.
Patent Abstracts of Japan 03078668A, Published Apr. 3, 1991, Mitsubishi Electric Corp.

* cited by examiner

*Primary Examiner*—John Barlow
*Assistant Examiner*—Hien Vo
(74) *Attorney, Agent, or Firm*—Sughrue Mion, PLLC

(57) ABSTRACT

An abnormality detection apparatus for a position detection device is provided which is capable of performing abnormality detection accurately and inexpensively. The position detection device has a primary winding and a secondary winding, and at least one excitation signal each having a predetermined periodic waveform is supplied to the primary winding to thereby generate at least one output signal each in the form of a phase modulated signal corresponding to a rotational position of a rotating member from the secondary winding directly or after having been subjected to phase shifting and appropriate arithmetic operations. The apparatus is provided with an abnormality detection section for determining an abnormality of the position detection device when the phase modulated signal has a peak value which is outside a predetermined range.

14 Claims, 10 Drawing Sheets

APPARATUS AND METHOD FOR DETECTING ABNORMALITY IN A POSITION DETECTION DEVICE

This application is based on Application No. 2001-115250, filed in Japan on Apr. 13, 2001, the contents of which are hereby incorporated by reference.

BACKGROUND OF THE INVENTION

1. Field of the Invention

The present invention relates to an abnormality detecting apparatus and method for detecting abnormality in a position detection device, which is applicable for both rotational position detection and linear position detection, including a rotational position detector such as a position detecting resolver, a position detecting synchronizer, etc., and a linear position detector utilizing position detection principles similar to those for rotational position detection. More specifically, it relates to abnormality determination and processing in such a position detection device in an electrically operated or motorized power steering system for assisting an operator's steering effort exerted on a steering wheel by means of an electric motor.

2. Description of the Related Art

In the past, a resolver, a typical one of such kinds of position detectors, has been employed for rotational position detection in which output signals from two orthogonally arranged winding members are input to a resolver digital converter (hereinafter simply referred to as R/D converter). By the use of this position detection device, a motor for a motorized power steering system is controlled to rotate.

An example of such a resolver is illustrated in FIG. 11. In FIG. 11, the resolver 10 has a single primary winding member to which an excitation signal (sin $\omega$t) 14, which is a sine wave voltage for excitation of the resolver, is input from an oscillation circuit 12. The resolver 10 also has two secondary winding members arranged in a mutually orthogonal relation with respect to each other to output induction signals 16, 18, which are generated, for example, by amplitude modulating the excitation signal 14 with cos $\theta$ and sin $\theta$, respectively, in accordance with the rotational position $\theta$ of the motor of the motorized power steering system. Hereinafter, the output signal of the secondary winding members generated through amplitude modulation with cos $\theta$ is referred to as a cos signal 16, and the output signal of the secondary windings generated by amplitude modulation with sin $\theta$ is referred to as a sin signal 18. These two output signals 16 and 18 are input to the R/D converter 20 which then generates a digital signal representative of the detected rotational position $\theta$. The digital signal of this rotational position $\theta$ is input to a control section 22 for use in the prescribed control.

When there takes place a break in the resolver, there might be caused malfunctions of various control mechanisms, and hence such a break has to be detected promptly. To detect abnormality in the resolver, there has conventionally been implemented a method of individually detecting the excitation signal 14, the cos signal 16 and the sin signal 18, respectively. In addition, another method of simultaneously detecting breaks in signal lines for these three signals has also been proposed. This method is advantageous in that simultaneous detection of breaks in the three lines serves to reduce the number of component elements and provide inexpensive broken-line detection as compared with the aforementioned individual broken-line detection method. An exemplary method of simultaneously detecting breaks in three lines is disclosed, for instance, in Japanese Patent Application Laid-Open No. 3-78668. FIG. 12 illustrates the construction of a conventional position detecting apparatus for simultaneous detection of breaks in three lines. In FIG. 12, two excitation signals supplied to a resolver 102 from an oscillation circuit 100 are gain adjusted into signals Vsin $\omega$ by means of an amplifier 104, which are then input to a full-wave rectifier circuit 106 wherein they are full-wave rectified into a DC voltage. The output signal of the full-wave rectifier circuit 106 is input to a comparator or comparison circuit 108. Also, a sin signal 18 output from the resolver 102 is gain adjusted into a signal Vsin $\theta$ sin $\omega$t by means of an amplifier 110, which is then input to a phase shift circuit 112 where the signal Vsin $\theta$ sin $\omega$t is phase-shifted, by phase-shifting sin $\omega$t, into a signal Vsin $\theta$ cos $\omega$t which is in turn output therefrom to an addition circuit 114.

On the other hand, a cos signal 16 output from the resolver 102 is gain adjusted into a signal Vcos $\theta$ sin $\omega$t by means of an amplifier 116, which is then input to the addition circuit 114. In the addition circuit 114, the signals Vsin $\theta$ cos $\omega$t and Vcos $\theta$ sin $\omega$t are summed to provide a combined signal Vsin($\omega$t+$\theta$) as its output. Since this signal Vsin($\omega$t+$\theta$) shifts by a phase $\theta$ from the excitation signal Vsin $\omega$t, when full-wave rectified into a DC voltage by means of a full-wave rectifier 118, it provides the same DC signal as the output of the full-wave rectifier circuit 106. Then, the output of the full-wave rectifier 118 is also input to the comparison circuit 108, where the output voltage of the full-wave rectifier circuit 106 and the output voltage of the full-wave rectifier circuit 118 are compared with each other for determination of a break in the resolver 102. When a break is generated in the resolver 102, the output DC voltages from the two full-wave rectifier circuits 106, 118 become unequal whereby the break of the resolver 102 can be detected.

In the conventional abnormality detection apparatus for the position detection device as constructed above, the full-wave rectifier circuits each of a complicated construction are needed, thereby increasing the number of component elements and hence the cost of manufacture as well. Moreover, for example, in the event that the resolver is rotating with the signal line for the sin signal being broken, it is determined that the resolver is normal at a rotational position or angle of 0 or 180 degrees, and abnormal at all the other rotational positions or angles. Therefore, determinations of normality and abnormality are repeated, thus making it impossible to definitely determine the abnormality of the resolver.

SUMMARY OF THE INVENTION

The present invention is intended to obviate the above-mentioned problems, and has for its object to provide an abnormality detecting apparatus and method for a position detection device which is capable of performing abnormality detection with improved accuracy at low costs by detecting abnormality based on a peak value of a phase-modulated signal obtained corresponding to the rotational position of a rotating element such as a motor, the rotational position of which is to be detected.

Bearing the above object in mind, according to one aspect of the present invention, the invention resides in an abnormality detection apparatus for a position detection device in which at least one excitation signal having a predetermined periodic waveform is supplied to primary winding of a position detection sensor to thereby generate at least one output signal in the form of a phase modulated signal corresponding to a rotational position of a rotating member from secondary winding of the position detection sensor directly or after having been subjected to phase shifting and arithmetic operations, said apparatus comprising an abnormality detection section for determining an abnormality of said position detection device when said phase modulated signal has a peak value which is outside a predetermined range.

In a preferred form of the present invention, the abnormality detection section comprises: a peak hold circuit for detecting a peak value of said phase modulated signal and holding it for a predetermined period of time; and an abnormality detection determination processing section for determining abnormality when the peak hold value of said peak hold circuit is outside a predetermined range.

In another preferred form of the present invention, the peak hold circuit comprises a capacitor for setting a time constant, which is used for holding said peak value of said peak hold circuit, to a value sufficiently greater than a period of said phase modulated signal.

In a further preferred form of the present invention, the peak hold value of said peak hold circuit is input directly to said abnormality detection determination processing section.

In a yet further preferred form of the present invention, the abnormality detection determination processing section outputs a reset signal for resetting the peak hold value of said peak hold circuit.

In a still further preferred form of the present invention, the abnormality detection section comprises an abnormality detection determination processing section which, by means of software processing, takes in said phase modulated signal, calculates a peak value of said phase modulated signal and determines abnormality when said peak value is outside a predetermined range.

In a further preferred form of the present invention, the abnormality detection determination processing section is provided alone.

In a further preferred form of the present invention, said abnormality detection determination processing section is built in a control element which controls an object of which position is to be detected.

In a further preferred form of the present invention, said abnormality detection section determines an abnormality of said position detection device when the condition in which said peak value or peak hold value is outside a predetermined range continues for a predetermined period of time.

In a further preferred form of the present invention, said abnormality detection section counts the number of accumulative occurrences of the condition in which said peak value or peak hold value is outside a predetermined range, and determines an abnormality of said position detection device when said number of accumulative occurrences thus counted becomes equal to or greater than a predetermined value.

In a further preferred form of the present invention, an object of which position is to be detected by said position detection sensor is a motor for assisting a steering effort of an operator, and said position detection sensor detects a rotational position of said motor, and when said abnormality detection section determines an abnormality of said position detection device, a control unit with a motor drive circuit for driving said motor in a controlled manner operates to stop control for driving said motor thereby to prohibit motor driving.

In a further preferred form of the present invention, in said position detection device, said primary winding of said position detection sensor comprises a single primary winding member; said secondary winding of said position detection sensor comprises two secondary winding members arranged in an orthogonal relation with respect to each other; and an excitation signal having a predetermined periodic waveform is supplied to said single primary winding member whereby signals respectively induced in said two mutually orthogonal secondary winding members are subjected to phase shifting and arithmetic operations so as to cancel their unnecessary portions with each other thereby to provide a phase modulated signal corresponding to the rotational position of said rotating member.

In a further preferred form of the present invention, in said position detection device, said primary winding of said position detection sensor comprises two primary winding members arranged in an orthogonal relation with respect to each other; said secondary winding of said position detection sensor comprises a single secondary winding member; and two excitation signals having waveforms with a phase shift of 90 degrees relative to each other are supplied to said two mutually orthogonal primary winding members, whereby a phase modulated signal corresponding to the rotational position of said rotating member is induced in said single secondary winding member.

According to another aspect of the present invention, the invention resides in an abnormality detection method for a position detection device in which at least one excitation signal having a predetermined waveform is supplied to a primary winding side of a position detection sensor whereby a secondary winding side of said position detection sensor generates at least one output signal in the form of a phase modulated signal corresponding to a rotational position of a rotating member directly or after having been subjected to phase shifting and arithmetic operations, said method comprising step for determining an abnormality of said position detection device when said phase modulated signal has a peak value which is outside a predetermined range.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1.

Figure 1:
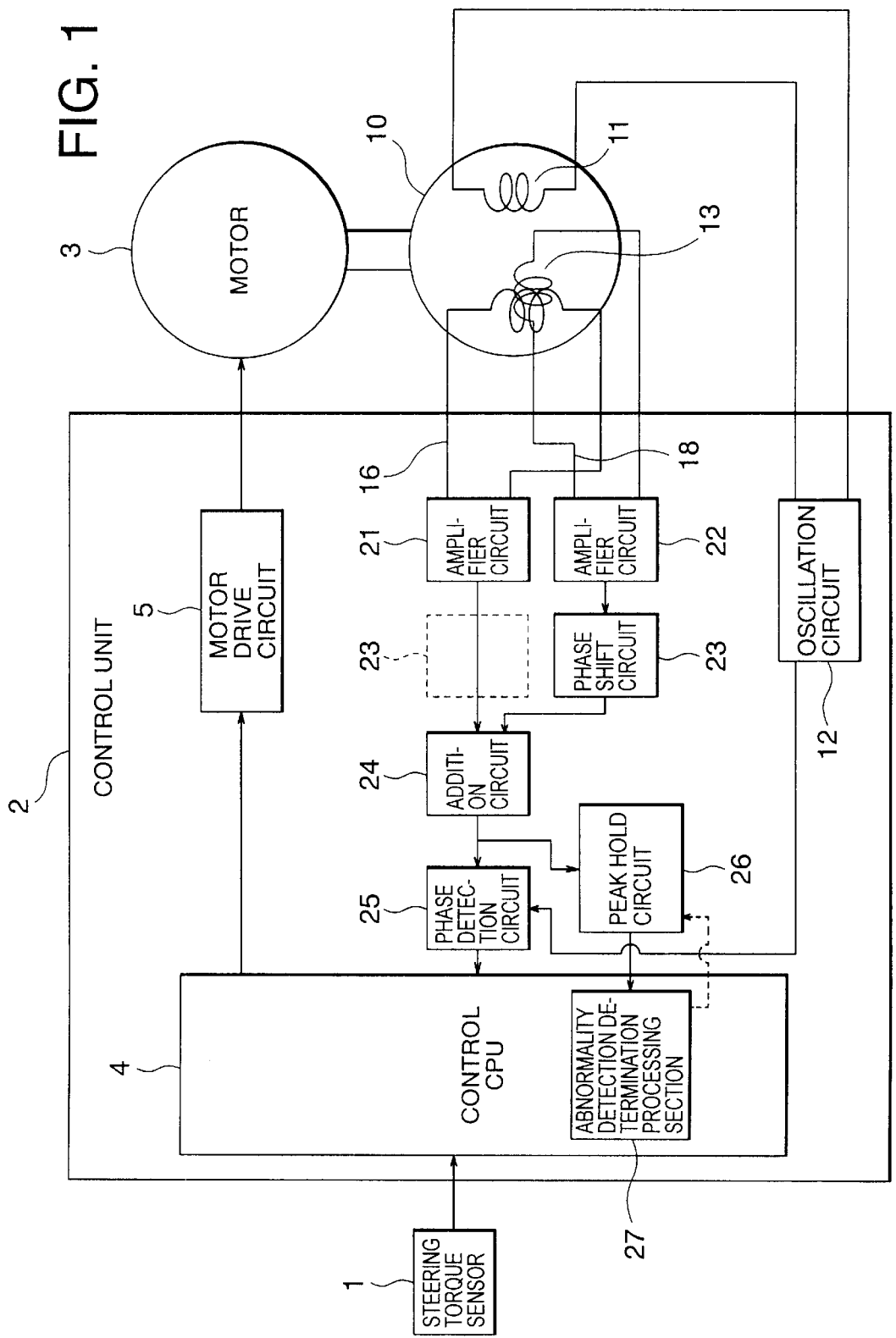
FIG. 1 is a view illustrating the construction of a motorized power steering system equipped with an abnormality detection apparatus for a position detection device in accordance with a first embodiment of the present invention.

FIG. 1 illustrates the construction of a motorized power steering system equipped with an abnormality detection apparatus for a position detection device according to a first embodiment of the present invention. The motorized power steering system schematically includes a steering torque sensor 1 for detecting an operator's steering effort or force exerted on a steering wheel (not shown) of a vehicle such as a motor car, a drive source in the form of a brushless motor 3 which is driven to rotate by electric current supplied thereto in accordance with the rotational position or the rotational speed of the steering wheel for steering assistance, a position sensor 10 such as, for example, a resolver for detecting the rotational position of the motor 3, and a control unit 2 for controlling the motor 3. The control unit 2 determines a target torque to be assisted by the motor 3 based on the steering torque detected by the steering torque sensor 1, detects the rotational position of the motor 3 based on the signal from the position sensor 10, determines a current supply pattern for supplying a current of the magnitude matched to the target torque in accordance with the motor position, and outputs the current thus determined to a motor drive circuit 5. The motor drive circuit 5 supplies the current to the motor 3 so that the motor 3 is thereby driven to rotate, generating a rotational force which acts as an assisting force for steering.

Turning now to the position sensor 10, the position sensor 10 has a primary winding 11 comprising a single primary winding member and a secondary winding 13 comprising two secondary winding members arranged in a mutually orthogonal relation with respect to each other. An excitation signal Fsin ωt output from an oscillation circuit 12 is input to an input-side or primary winding 11 of the position sensor 10, so that a cos signal 16 and a sin signal 18, which are amplitude modulated signals inclusive of positional information, are output as induction signals from the output-side or secondary winding 13 which is comprised of two mutually orthogonal winding members. The sin signal 18 output from the resolver 10 is gain adjusted by an amplifier 22 into a signal Vsin θ sin ωt which is then input to a phase shift circuit 23 as depicted by a solid line in FIG. 1. The phase sin ωt of the signal Vsin θ sin 7t is shifted by the phase shift circuit 23 into a signal Vsin θ cos ωt which is output therefrom to an addition circuit 24. On the other hand, the cos signal 16 output from the resolver 10 is gain adjusted by an amplifier 21 into a signal Vcos θ sin ωt which is input directly to the addition circuit 24.

The addition circuit 24 adds the signals Vsin θ cos ωt and Vcos θ sin ωt to each other to provide a combined signal Vsin(ωt+θ) as its output. This combined signal is a signal which shifts by a phase θ from the excitation signal Fsin ωt. Therefore, by detecting a phase difference between the excitation signal Fsin ωt and the combined signal Vsin(ωt+θ) by means of a phase detection circuit 25, the rotational position θ of the motor 3 can be detected. In addition, a subtraction circuit may be employed in place of the addition circuit 24, and in this case, the combined signal Vsin(ωt+θ) is replaced with a combined signal Vsin(ωt−θ). Moreover, although only one phase shift circuit 23 is provided for simplification of the entire circuitry, a pair of phase shift circuits may instead be employed one for each phase, as indicated by a broken line in FIG. 1, in such a manner that the signals of two phases are relatively shifted by 90 degrees with respect to each other before being input to the addition circuit 24 (or subtraction circuit).

Figure 2:
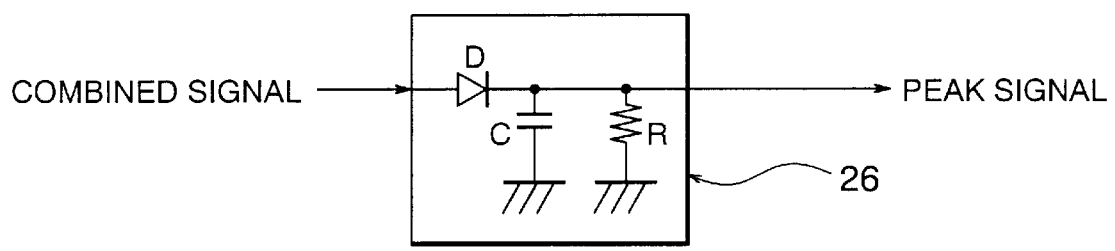
FIG. 2 is a principle view for a peak hold circuit according to the first embodiment of the present invention.
Figure 3:
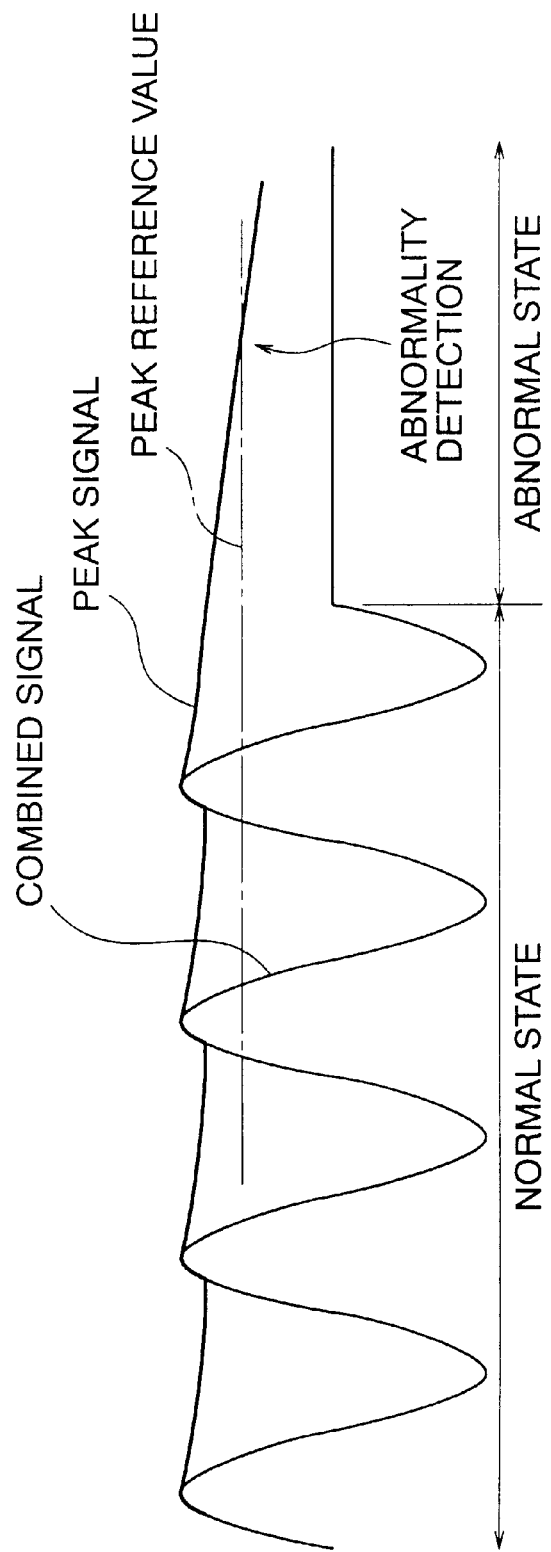
FIG. 3 is a timing chart for explaining a peak hold operation according to the first embodiment of the present invention.

At this time, the combined signal Vsin(ωt+θ) has a constant amplitude irrespective of θ. Peaks of the combined signal Vsin(ωt+θ) are detected as a peak signal by means of a peak hold circuit 26. FIG. 2 illustrates the principle of operation of the peak hold circuit 26. The circuit shown in FIG. 2 is to perform peak detection and discharge with a time constant RC. Also, the waveform at that time is illustrated in FIG. 3. The values of a resistor R and a capacitor C connected in parallel with each other as shown in FIG. 2 can be set so as to make the time constant sufficiently greater than a period or cycle 2π/ω of the phase modulated signal (the same as the period or cycle of the excitation signal), thus providing the intended effects with a simple circuit.

Figure 4:
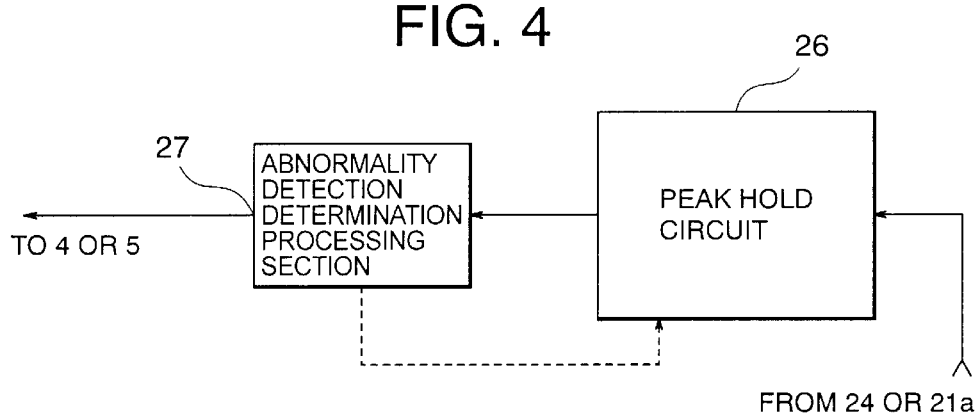
FIG. 4 is a view illustrating the construction of a modification of the abnormality detection apparatus according to the present invention.

In the normal state, the combined signal oscillates at a constant amplitude. Thus, the peak signal will also change nearly in the vicinity of a maximum value. However, the combined signal is stopped or decreased in its amplitude due to a break of the resolver or position sensor 10, a failure in the amplifier circuits 21, 22, the phase shift circuit 23 and the combining (addition or subtraction) circuit 24. At this time, the peak signal decreases gradually as the amplitude of the combined signal is becoming small (see FIG. 3). This signal is converted from analog into digital form and input to an abnormality detection determination processing section 27 built in a control element in the form of a control CPU 4 shown in FIG. 1, or to an abnormality detection determination processing section 27, which is provided independently or separately from the control CPU 4 as an abnormality detecting means, as shown in FIG. 4 and the function of which is performed by a program or programs executed by a CPU as in the control CPU 4. When it is determined by the abnormality detection determination processing section 27 that the peak signal is lower than a predetermined reference value (peak reference value), the position detection device is determined to be abnormal. In this case, for example, the abnormality detection determination processing section 27 generates an instruction to the motor drive circuit 5 for stopping the operation of the motor 3, thereby preventing a malfunction of the motor 3.

Figure 5:
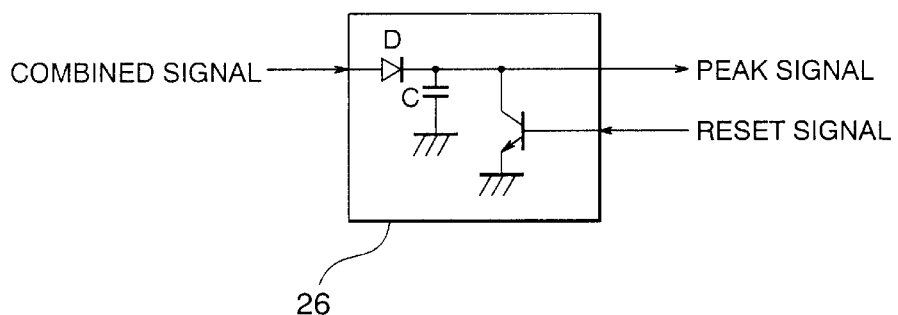
FIG. 5 is another principle view for a peak hold circuit of the present invention.

Further, although the principle of the peak hold circuit 26 using the time constant RC has been illustrated in FIG. 2, there may be added to the peak hold circuit 26 a reset circuit such as, for example, a switch circuit using a transistor for resetting a peak hold operation, as depicted in a principle view of FIG. 5. For instance, resetting can be made in such a manner that a reset signal is output by the control CPU 4 incorporating therein the abnormality detection determination processing section 27 of FIG. 1, or by the supervisory CPU or microcomputer which separately constitutes the abnormality detection determination processing section 27 shown in FIG. 4 at the time when the peak signal converted from analog into digital form has been input to the CPU 4 or the supervisory CPU or microcomputer.

Figure 6:
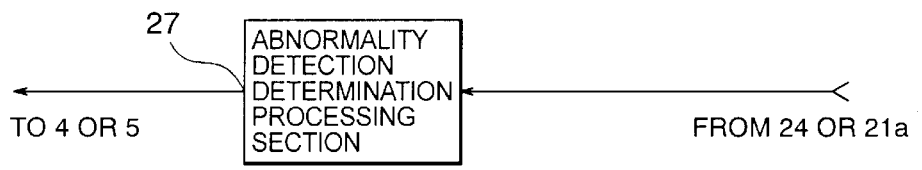
FIG. 6 is a view illustrating the construction of another modification of the abnormality detection apparatus according to the present invention.

Although in the above construction, the peak signal is formed through peak holding performed by the peak hold circuit, the combined signal (phase modulated signal) from the combining circuit in the form of the addition or subtraction circuit 24 as shown in FIG. 6 or a phase modulated signal (see FIG. 10) of an amplifier circuit 21a to be described later may instead be directly taken into the abnormality detection determination processing section 27 within the control CPU 4 as shown in FIG. 1, or into the abnormality detection determination processing section 27 comprised of a separate CPU or the like as shown in FIG. 4 at high speed while being subjected to A/D conversion, whereby calculations or arithmetic operations for finding a maximum value or a peak signal can be carried out inside such a CPU, thus providing a peak value.

Figure 7:
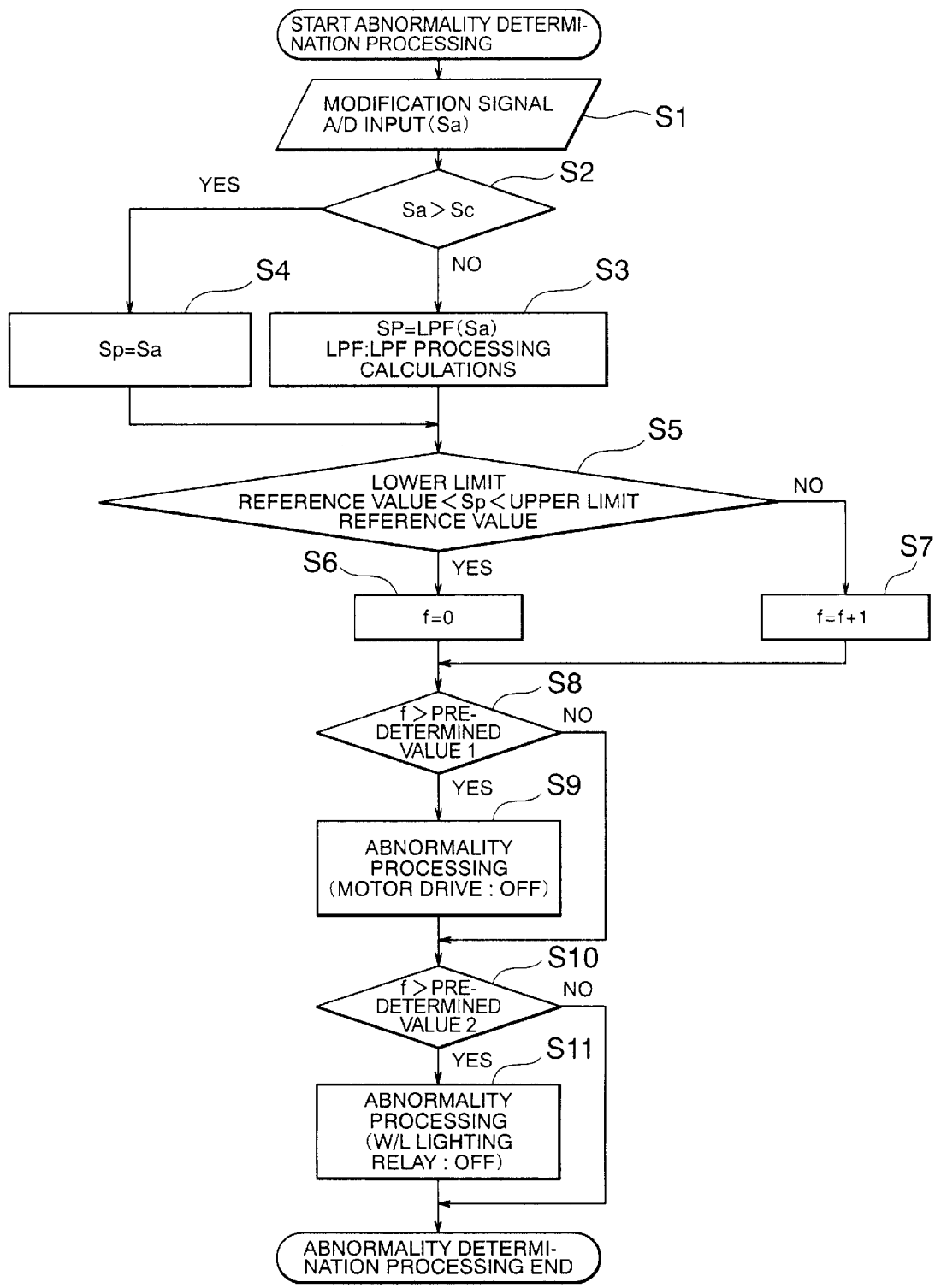
FIG. 7 is a flow chart for explaining the operation of the abnormality detection apparatus of FIG. 6 according to the present invention.

Now, reference will be made to the operation of the first embodiment when processing is directly carried out by the abnormality detection determination processing section 27 built in the CPU according to a flow chart of FIG. 7. First, in step S1, the phase modulated signal output by the addition circuit 24 or the like is A/D converted and input to the abnormality detection determination processing section 27. In this regard, however, the A/D conversion and inputting of the phase modulated signal is performed at such timing at which the phase modulated signal becomes a maximum value. In step S2, the input signal Sa is compared with an abnormality detection value Sc. When the input signal Sa is greater in magnitude than the abnormality detection value, the control process goes to step S4, and otherwise, processing in step S3 is executed. In step S3, the modulated signal Sa is subjected to digital low-pass filtering (LPF) with a sufficiently large time constant as in the method described and shown with reference to the peak hold circuit, and then it is output as a peak signal Sp to step S5. On the other hand, in step S4, the signal Sa is output as a peak signal Sp to step S5 as it is.

In step S5, it is determined whether the peak value Sp is equal to or less than a predetermined reference value, or whether the peak value Sp is within a predetermined range, as will be described later according to FIG. 9. When the answer in step S5 is positive (i.e., Sp≦the predetermined reference value or Sp is within the predetermined range), the control process then proceeds to step S6, and otherwise, it goes to step S7. In step S6, a failure counter f is reset to a count 0, and in step S7, the failure counter f is counted up by "1". In step S8, it is determined whether the count or value of the failure counter f is equal to or greater than a first predetermined value (also simply referred to as a predetermined value 1). When the answer in step S8 is positive (i.e., the count ≧predetermined value 1), it is determined that there is a possibility that abnormality has occurred, and processing in step S9 is carried out. In step S9, an occurrence OT abnormality is determined, whereby the driving of the motor 3 is temporarily stopped. Subsequently, in step S10, a determination is made as to whether the count or value of the failure counter f is equal to or greater than a second predetermined value (also simply referred to as a predetermined value 2). When the answer in step S10 is positive (i.e., the count ≧predetermined value 2), it is then determined in step S11 that the abnormal state has been fixed, and prescribed processing as referred to later is performed. Here, note that in order to make such an abnormality determination with more certainty than with the first predetermined value, the second predetermined value is set to be greater than the first predetermined value. In step S11, after the determination of abnormality has been fixed, at least one of the following operations is carried out: that is, a warning lamp (W/L) is turned on, or a relay for turning on and off the power supply for driving the motor 3 is switched off.

According to the processing in steps S3 and S4, a peak value can be obtained by performing the digital low-pass filtering (LPF) with a time constant greater than the oscillation period or cycle thereof while taking a maximum value of the phase modulated signal. Moreover, for the purpose of preventing an abnormality determination due to temporary signal disturbances, which might be caused by noise, etc., the occurrence of an abnormal state is counted so that the determination of abnormality is not made as long as the count is less than the first predetermined value. In addition, the provision of the first and second predetermined values serves to avoid an erroneous determination of abnormality with high redundancy, and even upon occurrence of abnormality, first-stage abnormality processing can be carried out with the use of the first predetermined value, thereby permitting the prevention of a malfunction to be speedily executed at the early stage.

Incidentally, in the above-mentioned motorized power steering system, which is operated by the vehicle operator or driver, there will be a time delay in the final or definite determination of abnormality, but it is by all means required to avoid any mistaken or incorrect determination of abnormality. Therefore, a desirable way of determining abnormality is that a determination of abnormality is made, thus stopping the driving of the motor when the condition in which the abnormality detection signal is below a predetermined reference value has continued for a certain period of time, rather than the case where an abnormality determination is made immediately when the peak value or peak hold value (see FIG. 8) of the abnormality detection signal (i.e., combined signal or phase modulated signal) is equal to or less than the predetermined reference value. As a result, abnormality determination can be unaffected even if the abnormality detection signal is temporarily mistaken or disturbed by the influence of noise, etc., but soon returns to the normal state.

Figure 8:
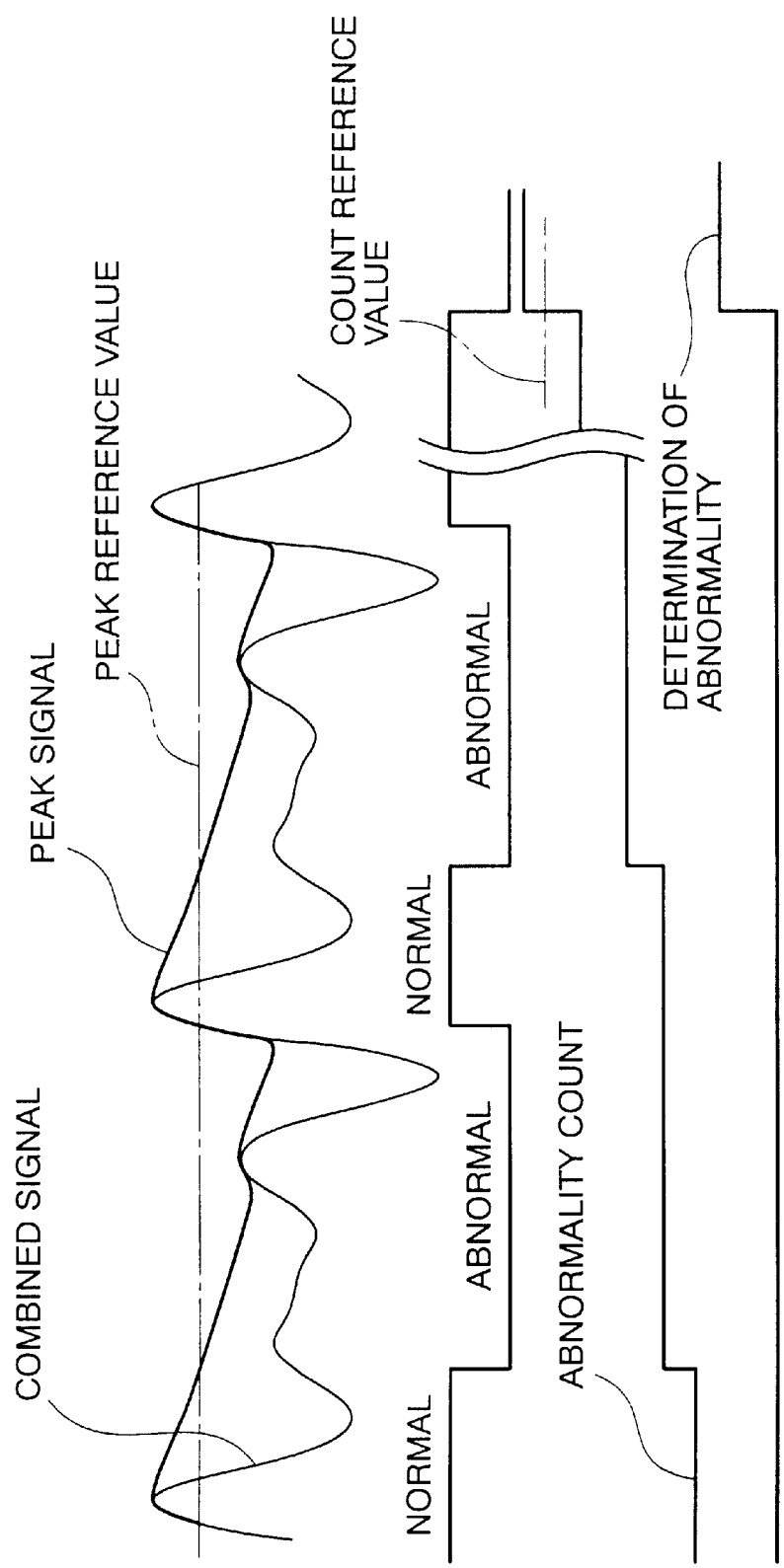
FIG. 8 is a timing chart for explaining a peak hold operation according to another example of the present invention.

For a concrete example of such a case, when the cos signal of the position sensor 10 is disconnected for instance, the combined signal becomes Vsin θ sin ωt, and hence, when θ takes 0 or 180 degrees, the peak of the combined signal becomes 0, whereas when θ takes 90 or 270 degrees, the peak of the combined signal becomes V, which is taken in normal operation. However, in the above-mentioned motorized power steering system, the steering wheel is frequently steered to the right or left in addition to being held constant, thus causing the motor to rotate so many times. For this reason, the motor frequently takes not only 90 or 270 degrees, at which abnormality detection is impossible, but also 0 or 180 degrees, at which abnormality detection is possible. In such a situation, according to the above-mentioned conventional abnormality detection method, the determination of normality and the determination of abnormality are repeated, so a failure can not be fixedly determined. In comparison with this, according to the present invention, the number of abnormality determinations is counted, as illustrated in FIG. 8, so that abnormality is fixedly or definitely determined when the count reaches a predetermined value. Thus, when normality determinations and abnormality determinations are repeated as referred to above, the count will exceed the predetermined value at last and hence the abnormality determination is fixed, thereby making it possible to determine the abnormality of the position detection even if a normality determination is thereafter made. Accordingly, an incorrect abnormality determination, if momentarily made due to noise or the like, can be soon removed without being fixed, whereby it is possible to accurately determine an actual or real abnormality alone. As a consequence, the detection of abnormality with high accuracy becomes possible.

Further, in order to prevent a determination of abnormality, if momentarily made by mistake due to noise or the like, from being immediately fixed as such, abnormality may be fixedly determined when the state which has been determined as abnormal, i.e., the condition in which the abnormality detection signal is equal to or less than a predetermined reference value, continues for a predetermined period of time.

Figure 9:
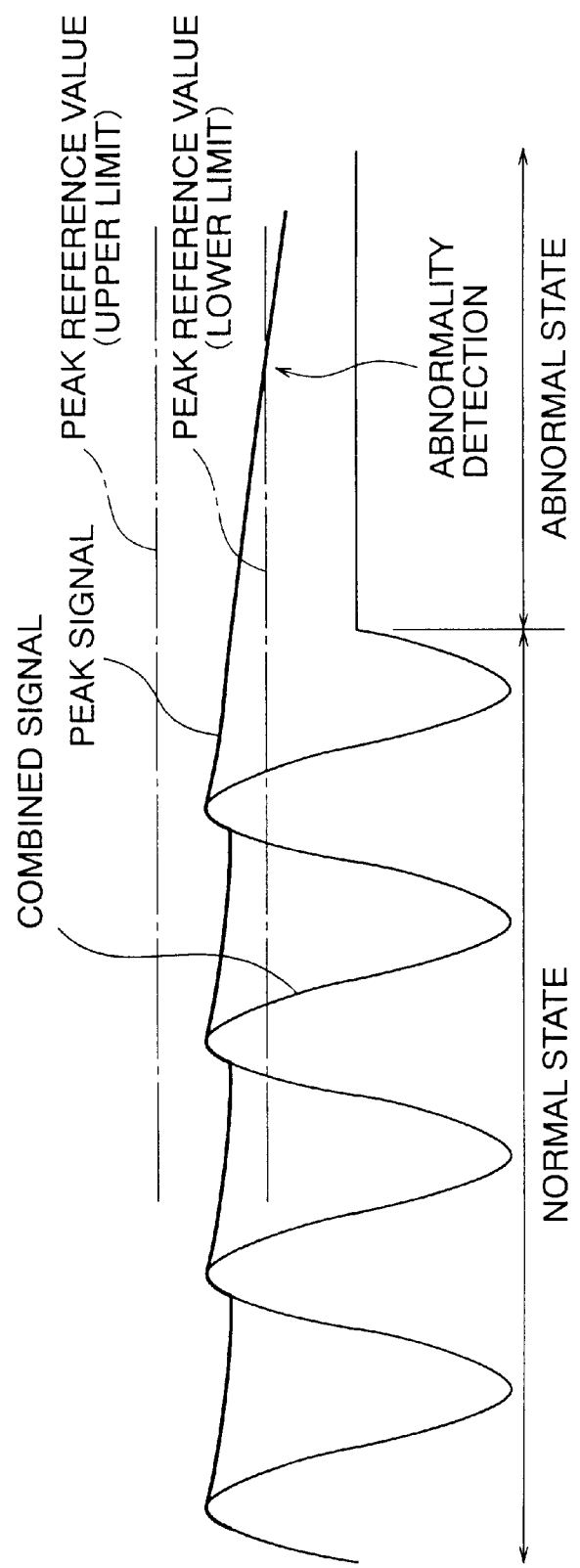
FIG. 9 is a timing chart for explaining an abnormality determination according to another example of the present invention.

Furthermore, although in the above-described example, abnormality is recognized when the abnormality detection signal (i.e., combined signal or phase modulated signal) is equal to or less than the predetermined reference value, another arrangement may be made in such a manner that a range between a predetermined upper peak reference value (upper limit value) and a predetermined lower peak reference value (lower limit value) is defined as a predetermined range, for example, as shown in FIG. 9, and abnormality is recognized when the abnormality detection signal is out of this range.

It can be easily achieved to count the number of abnormality determinations in the abnormality detection determination processing section 27, and to measure the duration of the state which is determined as abnormal, by constituting the counter and the timer with software for instance.

Embodiment 2.

Figure 10:
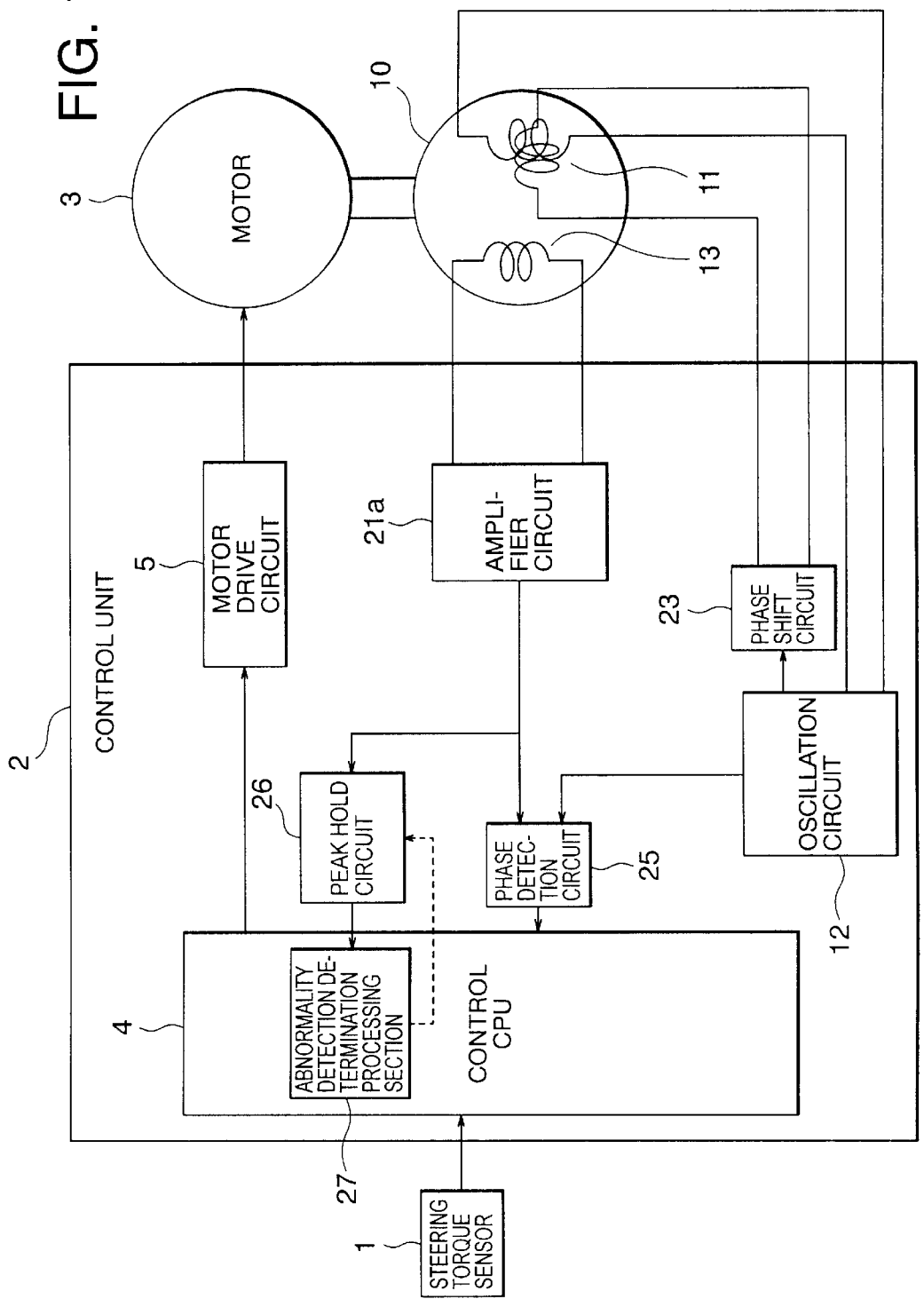
FIG. 10 is a view illustrating a motorized power steering system equipped with an abnormality detection apparatus for a position detection device in accordance with a second embodiment of the present invention.
Figure 11:
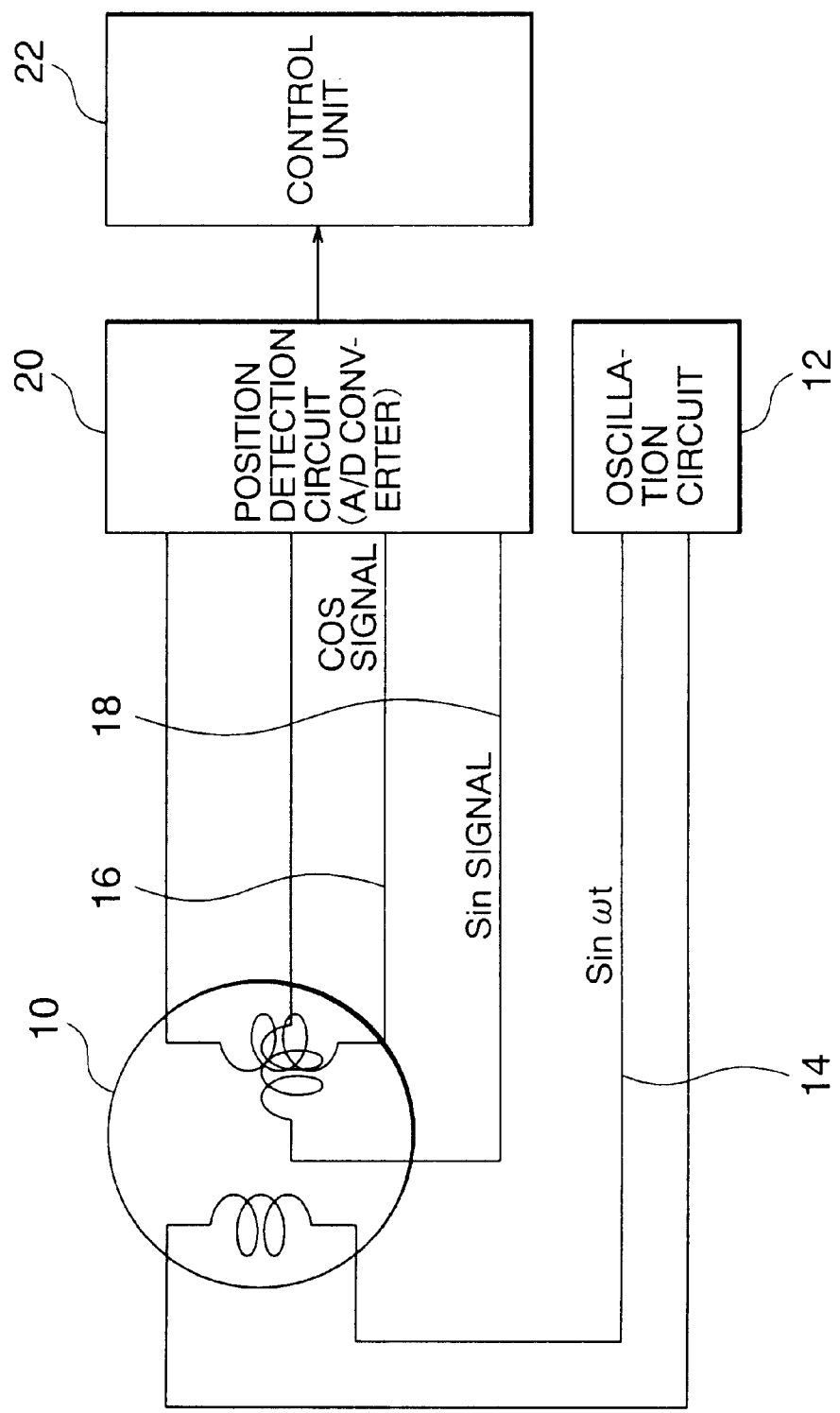
FIG. 11 is a view illustrating the construction of a resolver which is an example of a conventional position sensor.
Figure 12:
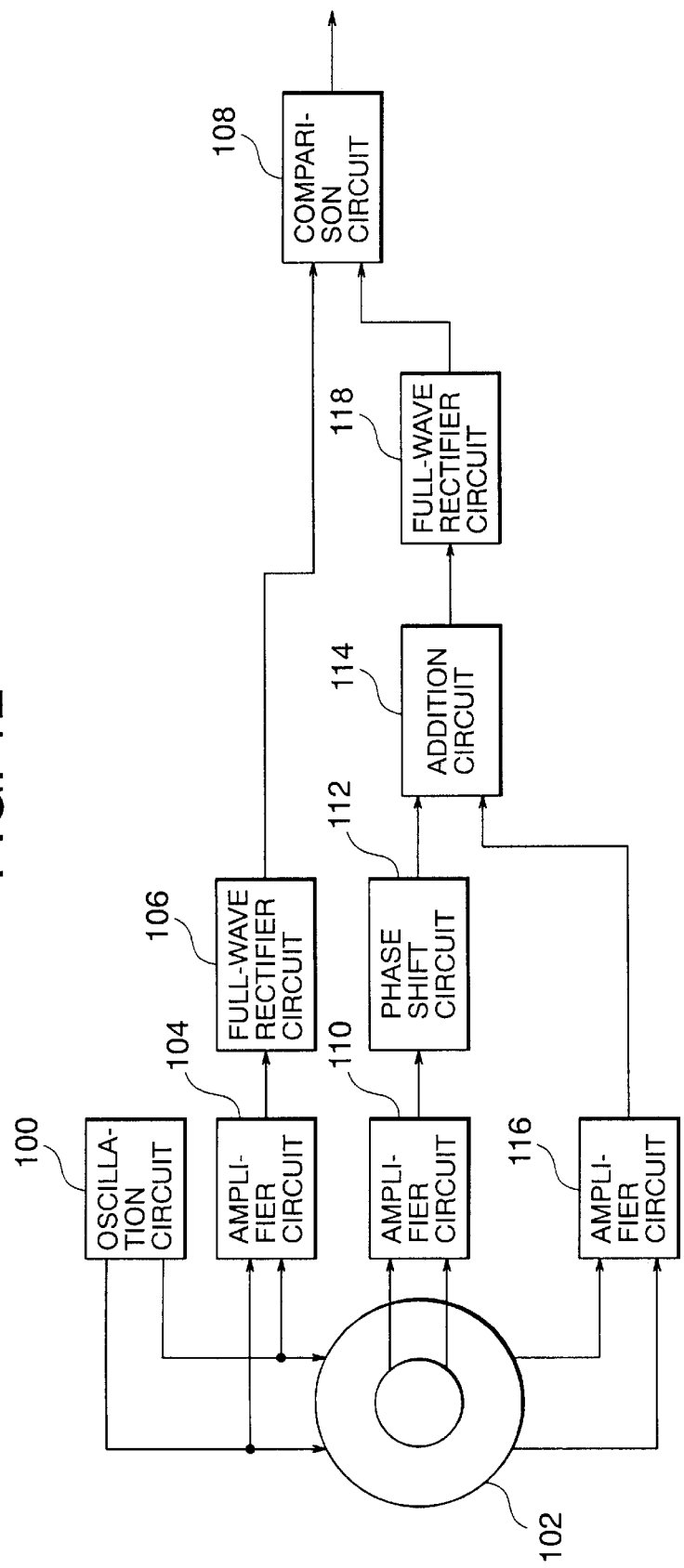
FIG. 12 is a view illustrating the construction of a conventional abnormality detection apparatus for a position detection device.

FIG. 10 illustrates the construction of a motorized power steering system using an abnormality detection apparatus for an position detection device in accordance with another embodiment of the present invention. In this figure, the same or corresponding parts as those of the above-mentioned embodiment are identified by the same symbols. In the above-mentioned first embodiment, a position sensor has been described in which a one-phase excitation signal alone is given to the position sensor so as to output two-phase phase modulated signals, but an apparatus according to this second embodiment as shown in FIG. 10 is constructed such that a first excitation signal Fsin ω t is supplied to one of two-phase mutually orthogonally arranged winding members of an input-side or primary winding 11 and a second excitation signal Fcos ωt is supplied to the other primary winding member, whereby an induction signal sin(ωt+θ) is generated by an output-side or secondary winding 13 in accordance with a detected rotational position θ of a rotating element in the form of a motor 3. When the induction signal sin(ωt+θ) thus generated is amplified by and output from the amplifier circuit 21a, a signal Vsin(ωt+θ) is obtained as in the above-mentioned first embodiment.

Thus, in this second embodiment, too, it is possible to detect the position θ by means of a phase detection circuit 25 as in the above-mentioned first embodiment, and hence an abnormality determination can be made by detecting a peak of the amplified phase modulated signal Vsin(ωt+θ), similar to the above-mentioned first embodiment.

As described above, the present invention provides the following advantages.

According to one aspect of the present invention, there is provided an abnormality detection apparatus for a position detection device having a primary winding and a secondary winding, in which at least one excitation signal having a predetermined periodic waveform is supplied to the primary winding of the position detection device to thereby generate at least one output signal in the form of a phase modulated signal corresponding to a rotational position of a rotating member from the secondary winding of the position detection device directly or after having been subjected to phase shifting and arithmetic operations. The apparatus includes an abnormality detection section for determining an abnormality of the position detection device when the phase modulated signal has a peak value which is outside a predetermined range. Thus, it is possible to achieve an accurate and inexpensive abnormality detection apparatus without using any full-wave rectifier circuit and the like.

Preferably, the abnormality detection section comprises: a peak hold circuit for detecting a peak value of the phase modulated signal and holding it for a predetermined period of time; and an abnormality determination processing section for determining abnormality when the peak hold value of the peak hold circuit is outside a predetermined range. Thus, abnormality detection can be performed with high accuracy.

Preferably, the peak hold circuit comprises a capacitor for setting a time constant, which is used for holding the peak value of the peak hold circuit, to a value sufficiently greater than a period of the phase modulated signal. This serves for highly accurate abnormality detection.

Preferably, the peak hold value of the peak hold circuit is input directly to the abnormality detection determination processing section.

Preferably, the abnormality detection determination processing section outputs a reset signal for resetting the peak hold value of the peak hold circuit, whereby the hold value of the peak hold circuit can be reset accurately.

Preferably, the abnormality detection section takes in the phase modulated signal, calculates a peak value of the phase modulated signal and determines abnormality when the peak value is outside a predetermined range. Thus, the apparatus can be provided at low cost by making it unnecessary to use a peak hold circuit separately.

In one embodiment, the abnormality determination section is provided separately from a control element which controls an object of which position is to be detected. This enables the present invention to be easily applied to a variety of kinds of apparatuses.

In another embodiment, the abnormality detection determination processing section is built in a control element which controls an object of which position is to be detected. Thus, the object of which position is to be detected can be easily made into conjunction with the control section.

Preferably, the abnormality detection section determines an abnormality of the position detection device when the condition in which the peak value or peak hold value is outside a predetermined range continues for a predetermined period of time. Accordingly, abnormality detection can be performed with further improved accuracy.

Preferably, the abnormality detection section counts the number of accumulative occurrences of the condition in which the peak value or peak hold value is outside a predetermined range, and determines an abnormality of the position detection device when the number of accumulative occurrences thus counted becomes equal to or greater than a predetermined value. This serves to improve accuracy in abnormality detection.

In a further embodiment, an object of which position is to be detected by the position detection device is a motor for assisting a steering effort of an operator, and the position detection device detects a rotational position of the motor, and when the abnormality detection section determines an abnormality of the position detection device, a control unit with a motor drive circuit for driving the motor in a controlled manner operates to stop control for driving the motor thereby to prohibit motor driving. This, it is possible to stop malfunctions in the motor driving control for a motor assisting the steering effort of the operator.

In a further embodiment, the primary winding of the position detection device comprises a single primary winding member; the secondary winding of the position detection device comprises two secondary winding members arranged in an orthogonal relation with respect to each other; and an excitation signal having a predetermined periodic waveform is supplied to the single primary winding member of the position detection device whereby signals respectively induced in the two mutually orthogonal secondary winding members of the position detection device are subjected to phase shifting and arithmetic operations so as to cancel their unnecessary portions with each other thereby to provide a phase modulated signal corresponding to the rotational position of the rotating member. With this arrangement, it is possible to provide an inexpensive position detection apparatus with a simple construction.

In a further embodiment, the primary winding of the position detection device comprises two primary winding members arranged in an orthogonal relation with respect to each other; the secondary winding of the position detection device comprising a single secondary winding member; and two excitation signals having waveforms with a phase shift of 90 degrees relative to each other are supplied to the two mutually orthogonal primary winding members, whereby a phase modulated signal corresponding to the rotational position of the rotating member is induced in the single secondary winding member. With this arrangement, it is possible to provide an inexpensive position detection apparatus with a further simplified construction.

According to another aspect of the present invention, there is provided an abnormality detection method for a position detection device in which at least one excitation signal each having a predetermined waveform is supplied to a primary winding side of the position detection device whereby a secondary winding side of the position detection device generates at least one output signal in the form of a phase modulated signal corresponding to a rotational position of a rotating member directly or after having been subjected to phase shifting and arithmetic operations, the method comprising determining an abnormality of the position detection device when the phase modulated signal has a peak value which is outside a predetermined range. Thus, it is possible to provide a highly accurate abnormality detection method for detecting an abnormality of a position detection apparatus.

While the invention has been described in terms of preferred embodiments, those skilled in the art will recognize that the invention can be practiced with modifications within the spirit and scope of the appended claims.

What is claimed is:

1. An abnormality detection apparatus for a position detection device in which at least one excitation signal having a predetermined periodic waveform is supplied to primary winding of a position detection sensor to thereby generate at least one output signal in the form of a phase modulated signal corresponding to a rotational position of a rotating member from secondary winding of the position detection sensor directly or after having been subjected to phase shifting and arithmetic operations, said apparatus comprising an abnormality detection section for determining an abnormality of said position detection device when said phase modulated signal has a peak value which is outside a predetermined range.

2. The abnormality detection apparatus for a position detection device according to claim 1, wherein said abnormality detection section comprises: a peak hold circuit for detecting a peak value of said phase modulated signal and holding it for a predetermined period of time; and an abnormality detection determination processing section for determining abnormality when the peak hold value of said peak hold circuit is outside a predetermined range.

3. The abnormality detection apparatus for a position detection device according to claim 2, wherein said peak hold circuit comprises a capacitor for setting a time constant, which is used for holding said peak value of said peak hold circuit, to a value sufficiently greater than a period of said phase modulated signal.

4. The abnormality detection apparatus for a position detection device according to claim 2, wherein the peak hold value of said peak hold circuit is input directly to said abnormality detection determination processing section.

5. The abnormality detection apparatus for a position detection device according to claim 2, wherein said abnormality detection determination processing section outputs a reset signal for resetting the peak hold value of said peak hold circuit.

6. The abnormality detection apparatus for a position detection device according to claim 1, wherein said abnormality detection section comprises an abnormality detection determination processing section which, by means of software processing, takes in said phase modulated signal, calculates a peak value of said phase modulated signal and determines abnormality when said peak value is outside a predetermined range.

7. The abnormality detection apparatus for a position detection device according to claim 2, wherein said abnormality detection determination processing section is provided alone.

8. The abnormality detection apparatus for a position detection device according to claim 2, wherein said abnormality detection determination processing section is built in a control element which controls an object of which position is to be detected.

9. The abnormality detection apparatus for a position detection device according to claim 1, wherein said abnormality detection section determines an abnormality of said position detection device when the condition in which said peak value or peak hold value is outside a predetermined range continues for a pre determined period of time.

10. The abnormality detection apparatus for a position detection device according to claim 1, wherein said abnormality detection section counts the number of accumulative occurrences of the condition in which said peak value or peak hold value is outside a predetermined range, and determines an abnormality of said position detection device when said number of accumulative occurrences thus counted becomes equal to or greater than a predetermined value.

11. The abnormality detection apparatus for a position detection device according to claim 1, wherein an object of which position is to be detected by said position detection sensor is a motor for assisting a steering effort of an operator, and said position detection sensor detects a rotational position of said motor, and when said abnormality detection section determines an abnormality of said position detection device, a control unit with a motor drive circuit for driving said motor in a controlled manner operates to stop control for driving said motor thereby to prohibit motor driving.

12. The abnormality detection apparatus for a position detection device according to claim 1, wherein, in said position detection device, said primary winding of said position detection sensor comprises a single primary winding member; said secondary winding of said position detection sensor comprises two secondary winding members arranged in an orthogonal relation with respect to each other; and an excitation signal having a predetermined periodic waveform is supplied to said single primary winding member whereby signals respectively induced in said two mutually orthogonal secondary winding members are subjected to phase shifting and arithmetic operations so as to cancel their unnecessary portions with each other thereby to provide a phase modulated signal corresponding to the rotational position of said rotating member.

13. The abnormality detection apparatus for a position detection device according to claim 1, wherein, in said position detection device, said primary winding of said position detection sensor comprises two primary winding members arranged in an orthogonal relation with respect to each other; said secondary winding of said position detection sensor comprises a single secondary winding member; and two excitation signals having waveforms with a phase shift of 90 degrees relative to each other are supplied to said two mutually orthogonal primary winding members, whereby a phase modulated signal corresponding to the rotational position of said rotating member is induced in said single secondary winding member.

14. An abnormality detection method for a position detection device in which at least one excitation signal having a predetermined waveform is supplied to a primary winding side of a position detection sensor whereby a secondary winding side of said position detection sensor generates at least one output signal in the form of a phase modulated signal corresponding to a rotational position of a rotating member directly or after having been subjected to phase shifting and arithmetic operations, said method comprising step for determining an abnormality of said position detection device when said phase modulated signal has a peak value which is outside a predetermined range.

* * * * *